(12) United States Patent
Kim et al.

(10) Patent No.: US 9,422,948 B2
(45) Date of Patent: Aug. 23, 2016

(54) ENERGY STORAGE SYSTEM AND METHOD FOR STORING ENERGY AND RECOVERING THE STORED ENERGY USING THE SYSTEM

(71) Applicant: HANWHA TECHWIN CO., LTD., Changwon-Si (KR)

(72) Inventors: Myeong-hyo Kim, Changwon (KR); Jong-sub Shin, Changwon (KR); Young-Chang Shon, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 539 days.

(21) Appl. No.: 13/920,196

(22) Filed: Jun. 18, 2013

(65) Prior Publication Data

US 2014/0026547 A1 Jan. 30, 2014

(30) Foreign Application Priority Data

Jul. 27, 2012 (KR) ........................ 10-2012-0082786

(51) Int. Cl.
| | |
|---|---|
| *F16D 31/02* | (2006.01) |
| *F15B 15/00* | (2006.01) |
| *F03B 13/00* | (2006.01) |
| *F03G 6/00* | (2006.01) |
| *F01B 29/00* | (2006.01) |
| *F01B 29/02* | (2006.01) |

(52) U.S. Cl.
CPC ................. *F15B 15/00* (2013.01); *F03B 13/00* (2013.01); *F03G 6/00* (2013.01); *F01B 29/00* (2013.01); *F01B 29/02* (2013.01); *Y02E 10/46* (2013.01)

(58) Field of Classification Search
CPC ........... F01B 29/00; F01B 29/02; F01B 31/00
USPC ............................................. 60/415
See application file for complete search history.

(56) References Cited

U.S. PATENT DOCUMENTS

| | | | | |
|---|---|---|---|---|
| 4,309,152 A | * | 1/1982 | Hagen | F04B 49/12 417/218 |
| 7,663,255 B2 | | 2/2010 | Kim et al. | |
| 7,802,462 B2 | | 9/2010 | Standiford | |
| 2009/0200805 A1 | * | 8/2009 | Kim | F02C 6/16 290/52 |
| 2011/0259442 A1 | * | 10/2011 | McBride | H02J 15/006 137/334 |
| 2012/0174569 A1 | * | 7/2012 | Ingersoll | F02C 6/16 60/327 |

FOREIGN PATENT DOCUMENTS

| | | |
|---|---|---|
| JP | 06050109 A | 2/1994 |
| JP | 2000352371 A | 12/2000 |
| KR | 100792790 B1 | 1/2008 |

* cited by examiner

*Primary Examiner* — Nathaniel Wiehe
*Assistant Examiner* — Daniel Collins
(74) *Attorney, Agent, or Firm* — Sughrue Mion, PLLC

(57) ABSTRACT

There is provided an energy storage system. The system includes a storage tank, a reservoir connected to the storage tank configured to store fluid and exchange the stored fluid with the storage tank, at least one path configured to transfer the stored fluid between the storage tank and the reservoir, a pump configured to inject the stored fluid into the storage tank and compress air in the storage tank, and a generator configured to generate electricity by using the injected fluid transferred from the storage tank to the reservoir.

6 Claims, 16 Drawing Sheets

ENERGY STORAGE SYSTEM AND METHOD FOR STORING ENERGY AND RECOVERING THE STORED ENERGY USING THE SYSTEM

CROSS-REFERENCE TO RELATED PATENT APPLICATION

This application claims priority from Korean Patent Application No. 10-2012-0082786, filed on Jul. 27, 2012 in the Korean Intellectual Property Office, the disclosure of which is incorporated herein by reference in its entirety.

BACKGROUND

1. Field

Apparatuses and methods consistent with exemplary embodiments relate to an energy storage system and a method of storing energy and recovering the stored energy using the system.

2. Description of the Related Art

In the case of power generation systems, such as power generation systems using new renewable energy where amounts of generated power per unit time are irregular, temporary storage of energy is needed to allow for amounts of generated power per unit time to be constant.

In the related art, previously used pumped-storage power plants or compressed air energy storage (CAES) systems are used as facilities for temporary storage of surplus energy.

Pumped-storage hydroelectricity is an energy storage method in which water is pumped from a lower elevation reservoir to a higher elevation reservoir by using surplus power, thereby converting electric energy into potential energy. The pumped-storage hydroelectricity is disadvantageous due to expenses incurred for installation, as huge facilities are required for forming head drop of water.

On the other hand, CAES systems are on a smaller scale than pumped storage power plants but lose energy due to external dispersion of heat generated while compressing air. Also, when generating power while discharging air, a temperature is lowered resulting in reduction in volume of the discharged air and decrease in efficiency of electric power generation.

SUMMARY

One or more exemplary embodiments provide an energy storage system capable of being installed on a small scale relative to pumped storage power plants, of providing thermal energy loss that is relatively less in comparison to typical compressed air energy storage (CAES) systems, and of effectively restraining a decline in power generation efficiency due to a drop of air temperature.

According to an aspect of an exemplary embodiment, there is provided an energy storage system including a storage tank, a reservoir connected to the storage tank and configured store fluid and exchange the stored water with the storage tank, at least one path configured to transfer of the stored fluid between the storage tank and the reservoir, a pump capable configured to inject the stored fluid into the storage tank and compress air in the storage tank, and a generator configured to generate electricity using the injected fluid transferred from the storage tank to the reservoir.

The at least one path may be configured to transfer the injected fluid from the storage to the reservoir using the compressed air in the storage tank and the system may further include a plurality of valves configured to selectively control flows of the stored fluid between the storage tank and the reservoir.

The generator may generate the electricity using a rotational force of a wheel of the pump wherein the rotational force may be generated by the transferred injected fluid rotating the wheel.

The system may further include a spray device configured to spray the stored fluid into the storage tank.

The spray device may be configured to receive the sprayed fluid from the pump.

The reservoir may be a lake, and the storage tank may be provided under the ground below a bottom of the lake.

The reservoir may be sea, and the storage tank may be provided under the ground below a bottom of the sea.

The system may further include an air injection path and an air discharge path configured to control an amount of the air in the storage tank.

The system may further include a compressor configured to inject compressor air into the storage tank.

The system may further include an air discharge path configured to selectively discharge the compressed air and the compressor air in the storage tank, and a turbine generator configured to discharge the compressed air and compressor air and generate electricity.

The system may further include an air discharge path configured to selectively discharge the compressed air and the compressor air in the storage tank, a combustor configured to generate a combustion gas by using the selectively discharged compressed air and compressor air with a fuel, and a turbine generator configured to discharge the generated combustion gas from the combustor and generate electricity.

The system may further include a regenerative heat exchanger configured to transfer heat from the generated combustion gas to the discharged compressed air and compressor air.

According to an aspect of another exemplary embodiment, there is provided a method of storing and recovering energy. The method includes providing fluid in a reservoir, injecting the fluid into a storage tank, compressing air in the storage tank, maintaining pressure inside the storage tank, discharging the injected fluid in the storage tank using the compressed air to the reservoir, and generating electricity using the discharged fluid.

The method may further include injecting compressor air generated by a compressor into the storage tank.

The compressing the air in the storage tank may be performed until the compressed air in the storage tank reaches previously determined pressure, and the injecting of the fluid into the storage tank may be performed after injecting of the compressor air into the storage tank.

The method may further include spraying the stored fluid into the storage tank.

The spraying of the stored fluid into the storage tank may further include simultaneously injecting of the fluid into the storage tank.

The method may further include discharging the compressed air stored in the storage tank and generating electricity using the discharged compressed air.

The method may further include discharging the compressed air in the storage tank, combusting a fuel with the discharged compressed air to generate a combustion gas, and generating electricity using the combustion gas.

The method may further include heating the discharged compressed air using the combustion gas after the generating of the electricity.

BRIEF DESCRIPTION OF THE DRAWINGS

The above and/or other aspects will become more apparent by describing in detail exemplary embodiments thereof with reference to the attached drawings, in which.

DETAILED DESCRIPTION

Figure 1:
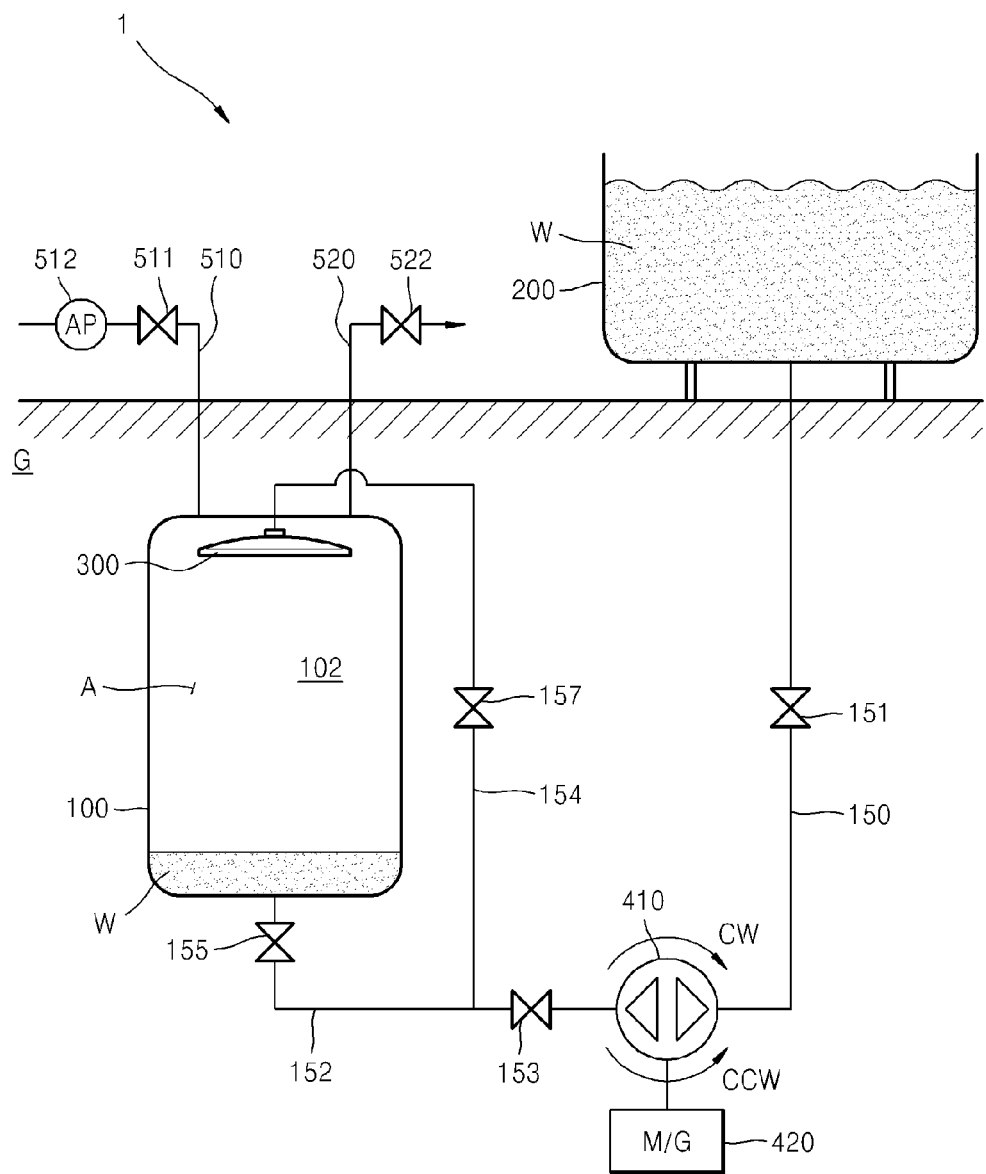
FIG. 1 is a schematic view illustrating an energy storage system according to an exemplary embodiment.

As used herein, the term "and/or" includes any and all combinations of one or more of the associated listed items.

Hereinafter, there will be described energy storage systems according to exemplary embodiments of the present invention with reference to the drawings. In the attached drawings, since like reference numerals denote like reference elements, a repetitive description thereof may be omitted.

FIG. 1 is a schematic view illustrating an energy storage system 1 according to an exemplary embodiment. Referring to FIG. 1, the energy storage system 1 includes a storage tank 100, a reservoir 200, a first flow path 150, an air injection path 510, an air discharge path 520, a spray device 300, a pump/turbine 410, and a motor/generator 420.

The storage tank 100 includes a sealable inner space 102 to store high-pressure air therein. The storage tank 100 may be installed on the ground G or under the ground G, but may preferably be installed under the ground G for maintaining stability and temperature.

The reservoir 200 includes a space therein to store water W. The reservoir 200, which stores the water W, may be uncovered or covered. The reservoir 200 may be installed on the ground G or under the ground G.

The first flow path 150 interconnects the storage tank 100 and the reservoir 200 to allow an exchange of the water W therebetween. The first flow path 150 includes first valves 151 and 153 to control a movement of the water W. That is, the first valves 151 and 153 either opens to allow the movement between the storage tank 100 and the reservoir 200 or closes to block the movement between the storage tank 100 and the reservoir 200. The first flow path 150 is divided at the pump/turbine 410 into a second flow path 152 and a third flow path 154, both of which connect to the storage tank 100. The second flow path 152 is connected to a bottom of the storage tank 100 and the third flow path 154 is connected to the spray device 300 disposed a top of the storage tank 100. To control a movement of the water W between the storage tank 100 and the reservoir 200, the second flow path 152 includes a second valve 155 and the third flow path 154 includes a third valve 157.

The air injection path 510 is connected to the storage tank 100 at one end to inject air A into the storage tank 100. The air injection path 510 includes a valve 511 for controlling opening and closing of the air injection path 510 and the air injection path is connected to an air pump 512 at the other end which injects air A into the storage tank 100.

The air discharge path 520 is connected to the storage tank 100 at one end to discharge the air A through the other end. The air discharge path 520 includes a valve 522 for controlling opening and closing of the air discharge path 520.

In the present exemplary embodiment, the air injection path 510 and the air discharge path 520 are described as two separate components. However, as long as the air injection path 510 and the air discharge path 520 may perform the described functions, it is not necessary to provide two separate paths as shown in the present exemplary embodiment. That is, one path may be used as both the air injection path 510 and as the air discharge path 520 with air injection and air discharge occurring at different times.

The spray device 300 is connected to the third flow path 154 and includes an injection nozzle for injecting the water W into an interior of the storage tank 100. In other words, the spray device 300 receives the water W from the pump/turbine 410 attached to the first flow path 150 through the third flow path 154 and injects the water W into the interior of the storage tank 100. The injection nozzle of the spray device 300, to spray the water W to the storage tank 100, pulverizes the water W flowing from the third flow path 154 into small water drops. When the spray device 300 sprays the water W to the storage tank 100, air in the storage tank 100 is saturated with water vapor, and water droplets of small sizes float therein. Except for the water vapor floating in the air, the sprayed water is collected on the bottom of the storage tank 100 in liquid form.

The pump/turbine 410 is connected to the first flow path 150, and a water wheel of the pump/turbine 410 is rotated in either a clockwise CW direction or a counter-clockwise direction CCW depending on whether the water W flows into the pump/turbine 410 from the first flow path 150 or out of the pump/turbine 410 into the first flow path 150. When the water W flows from the reservoir 200 to the storage tank 100 and the water wheel of the pump/turbine 410 rotates in a clockwise direction CW, the pump/turbine 410 functions as a pump. Conversely, when the water W flows from the storage tank 100 to the reservoir and the water wheel of the pump/turbine 410 rotates in a counter-clockwise direction CCW, the pump/turbine 410 functions as a turbine. In the present exemplary embodiment, the pump/turbine 410 is configured as a single device and may function as a pump or a turbine according to a rotational direction of the water wheel. However, the exemplary embodiment is not limited thereto and a separate pump and a turbine may be provided. For example, a part of the first flow path 150 may be divided into a first divided flow path (not shown) and a second divided flow path (not shown) in parallel. The first divided flow path is open to allow the water W to flow when the water W flows from the reservoir 200 to the storage tank 100, the second divided flow path is open to allow the water W to flow when the water W flows from the storage tank 100 to the reservoir 200. In the above configuration, a pump may installed at the first divided flow path, and a turbine may be installed at the second divided flow path, thereby separately installing the pump and the turbine.

The motor/generator 420 is connected to the pump/turbine 410 and includes a rotor rotating according to rotation of the water wheel of the pump/turbine 410. In other words, depending on the situation, the motor/generator 420 may function as a motor forcibly rotating a pump or as a generator converting a rotational force of a turbine into electric energy.

When the motor/generator 420 functions as a motor, the motor 420M (See FIGS. 3A and 3B) receives power from an external power source and forcibly rotates the water wheel of the pump/turbine 410. The external power source supplying power to the motor 420M for driving the pump/turbine 410 may be surplus power generated by existing generation facilities such as thermoelectric power plants, hydroelectric power plants or new renewable power generation facilities such as solar photovoltaic systems, solar thermal generation systems, wind power plants, tidal power plants, and wave-power plants, etc.

When the motor/generator 420 functions as a generator 420G (See FIG. 5), the water W is transferred from the storage tank 100 to the reservoir 200 due to pressure of the air A in the storage tank 100, the water wheel of the pump/turbine 410 of the first flow path 150 rotates in a counter-clockwise direction CCW, and as a result the generator 420G generates electric power using a rotational force of the water wheel. In other words, the generator 420G, when the pump/turbine 410 functions as a turbine, converts a rotational force of the turbine into the electric power.

On the other hand, in the present exemplary embodiment, though it is described that the motor/generator 420 is configured as a single device and that functions thereof vary depending on the situation, the motor/generator 420 may be separately formed of a motor 420M and a generator 420G instead of being the single device. For example, when separately installing a pump and a turbine on the first and second divided flow path as discussed above, a motor may be connected to the pump and a generator may be connected to the turbine.

The electric power generated by the generator 420G may be used to compensate electric power shortage when an amount of generated electric power of other power generation facilities is not sufficient. Also, the electric power generated by the generator 420G may be used to provide a constant electric power output from power generation facilities using new renewable energy as the power output per unit time produced by the power generation facilities using new renewable energy varies much.

Next, a method of operating the energy storage system 1 according to the present exemplary embodiment with reference to the drawing is described.

Figure 2:
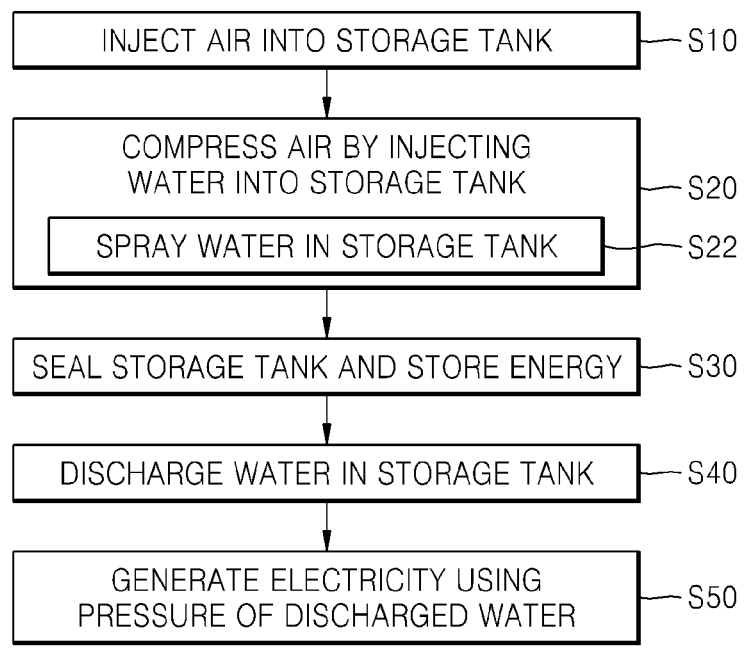
FIG. 2 is a flowchart illustrating a method of operating the energy storage system according to the exemplary embodiment of FIG. 1.

FIG. 2 is a flowchart schematically illustrating the method of operating the energy storage system 1 according to the exemplary embodiment as shown in FIG. 1.

Referring to FIG. 2, the method of operating the energy storage system 1 includes injecting air into the storage tank 100 (S10), injecting water W into the storage tank 100 and compressing the air (S20), sealing the storage tank 100 and storing energy (S30), discharging the water in the storage tank 100 (S40), and generating electric energy using pressure of the discharged water (S50).

In the injecting of the air into the storage tank 100 (S10), the storage tank 100 is filled with the air. To fill the storage tank 100 with the air, the air injection path 510 is opened and the air pump 512 is driven. Since the storage tank 100 only needs to be filled with the air, a high output compressor with a high compression rate is not necessary. In S10, when the air is injected excessively, the air discharge path 520 may be opened via the valve 522 and the air may be discharged.

Figure 3A:
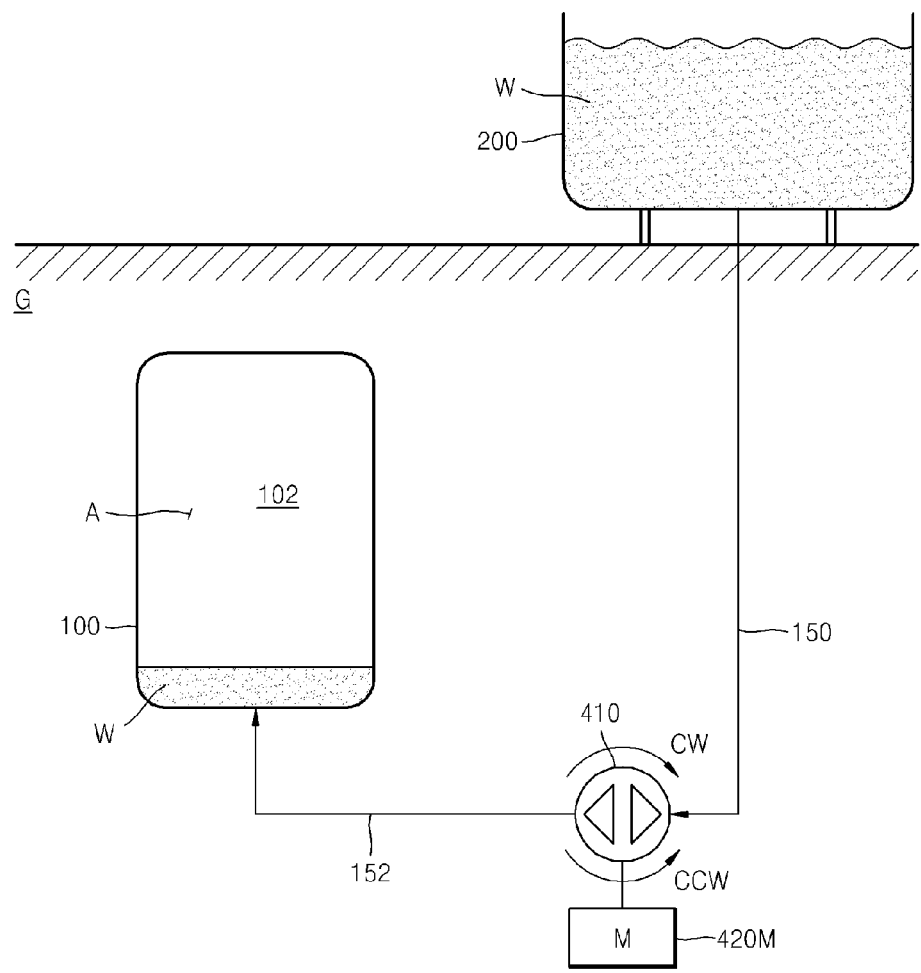
FIGS. 3A and 3B are views illustrating a state of storing energy in the energy storage system according to the exemplary embodiment of FIG. 1.
Figure 3B:
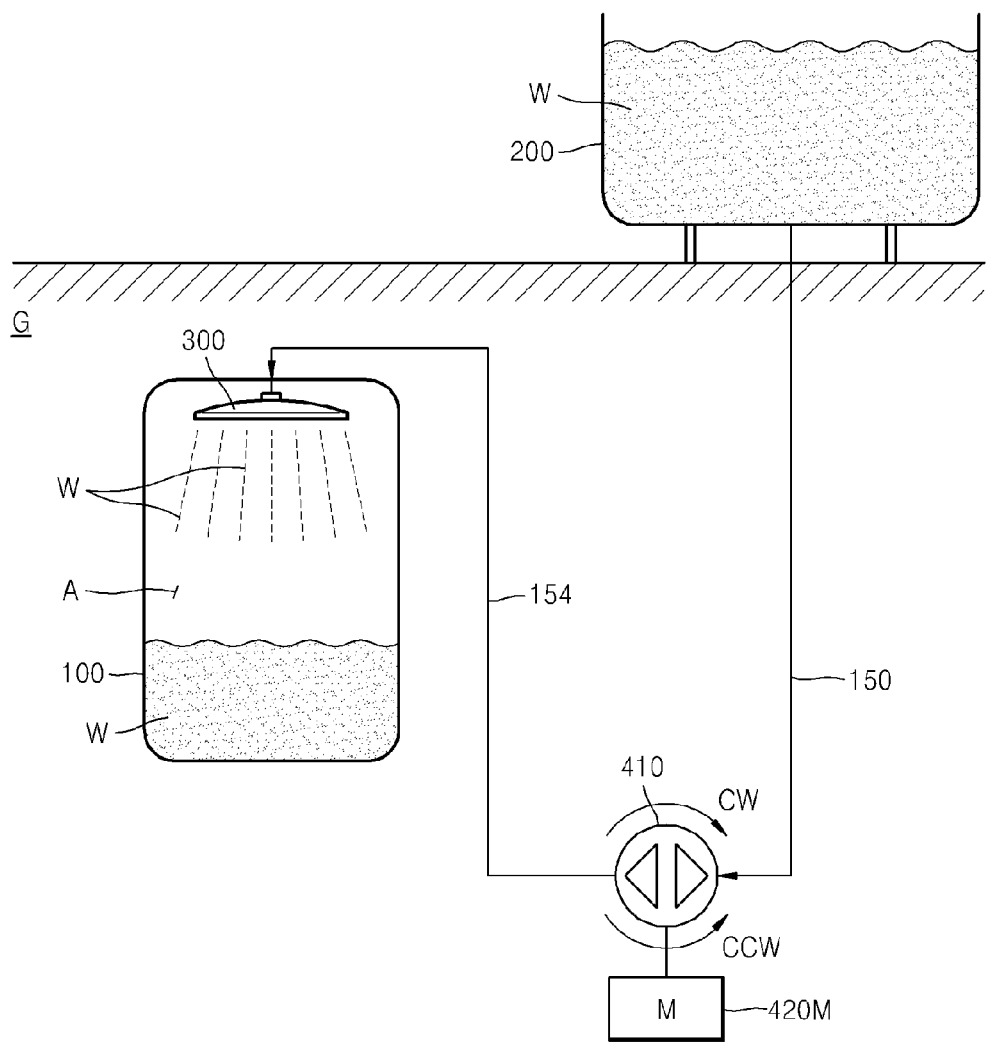

In the injecting of water W into the storage tank 100 and compressing the air (S20), the water W in the reservoir 200 is injected into the storage tank 100, thereby compressing the air in the storage tank 100. FIGS. 3A and 3B schematically illustrate the operation of injecting the water W into the storage tank 100 and compressing the air. Referring to FIG. 3A, the water W in the reservoir 200 is transferred to the storage tank 100 via the first flow path 150 and the second flow path 152. Since both the air injection path 510 and the air discharge path 520 are closed, the air in the storage tank 100 is compressed. Here, the motor 420M connected to the pump/turbine 410 is driven to forcibly transfer the water W from the reservoir 200 to the storage tank via the first flow path 150 and the second flow path 152, wherein the motor 420M may receive surplus power from another power generation plant in order to operate as a motor.

The water W is injected into the storage tank 100 and the air in the storage tank 100 is compressed, thereby generating heat, in which the heat generated by the compressed air is transferred to the water W. Since water has a very high specific heat capacity, there is a very small variance in a temperature, even when a large quantity of heat enters and exits. Accordingly, in the present operation, though the air in the storage tank 100 is compressed, the heat generated by the compressed air is absorbed by the water W, thereby effectively restraining an increase of the temperature of the air. That is, a process of compressing the air in the present operation is similar to an isothermal compression process. As described above, since the air is isothermally compressed in the present operation, it is possible to effectively reduce a decrease of compression efficiency due to the increase of the temperature of the air while compressing the air.

Also, since the water W in the storage tank 100 undergoes a state transition from a liquid into water vapor and isothermally absorbs heat, it is possible to additionally restrain the increase of the temperature of the air in the storage tank 100.

Compressing the air by pumping the water W into the storage tank 100, as in the present exemplary embodiment, in order to generate compressed air is much easier than a case of compressing the air by using an air compressor. In the case of using the air compressor, the output and the scale thereof should be very great in order to obtain high pressure of 100 bar or more. On the contrary, in the case of a fluid pump, it is relatively easy to obtain pressure heads of fluid of 100 bar or more. As described above, the energy storage system 1 may be more easily installed in comparison with a case using an air compressor and has excellent advantages with regards to energy utilization efficiency.

The operation of injecting water W into the storage tank 100 and compressing air (S20) may also include spraying the water W into the inside of the storage tank 100 (S22). For example, FIG. 3B is a schematic view illustrating a process of spraying the water W to the inside of the storage tank 100 and compressing the air within the storage tank 100. Referring to FIG. 3B, the water W in the reservoir 200 flows through the first flow path 150, the pump/turbine 410, the third flow path 154, and the spray device 300, and flows into the storage tank 100. Since the sprayed water floats in the air in the form of small water particles, a total surface area of the floating water in the storage tank is very large. Accordingly, heat may be more effectively exchanged between the water W flowing into the storage tank 100 and the air A in the storage tank 100. Also, since water particles may rapidly undergo a state transition into water vapor, it is possible to more effectively restrain the increase of the temperature of the air in the storage tank 100.

In the current exemplary embodiment, either the second flow path 152 or the third flow path 154 is selectively used in the operation of injecting water W into the storage tank 100 and compressing air (S20) for compressing the air by injecting the water W into the storage tank 100. However, the exemplary embodiment is not limited thereto and the second flow path 152 or the third flow path 154 may be selectively used or be used in combination. For example, while injecting the water W into the storage tank 100 via the second flow path 152, operating the spray device 300 via the third flow path 154 may be intermittently performed.

Figure 4:
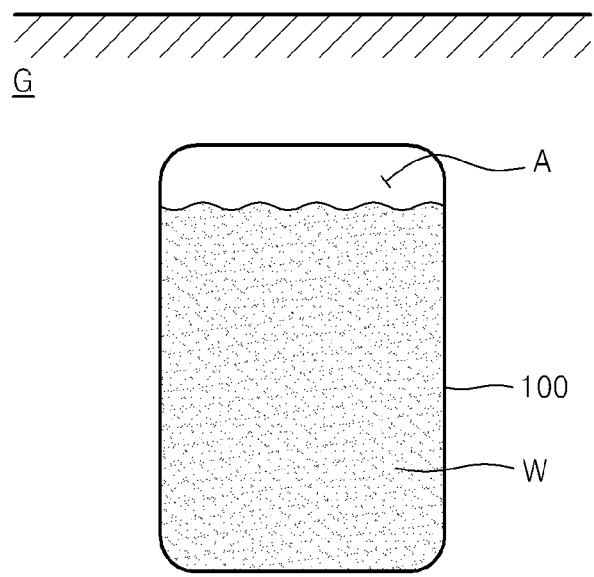
FIG. 4 is a view illustrating a state of storing energy in the energy storage system according to the exemplary embodiment of FIG. 1.

In the operation of sealing the storage tank 100 and storing energy therein (S30), the second flow path 152, the third flow path 154, the air injection path 510, and the air discharge path 520 are all closed to maintain the high pressure formed in the storage tank 100 in a state in which high pressure is generated in the storage tank 100 as shown in FIG. 4. In other words, surplus energy generated in the power generation plants is stored in the storage tank 100 as pressure energy by operating the motor 420M connected to the pump/turbine 410. Since a large amount of water W is stored in the storage tank 100, a variance in a temperature thereof is small, thereby effectively reducing heat dissipation of a part of the stored energy.

Figure 5:
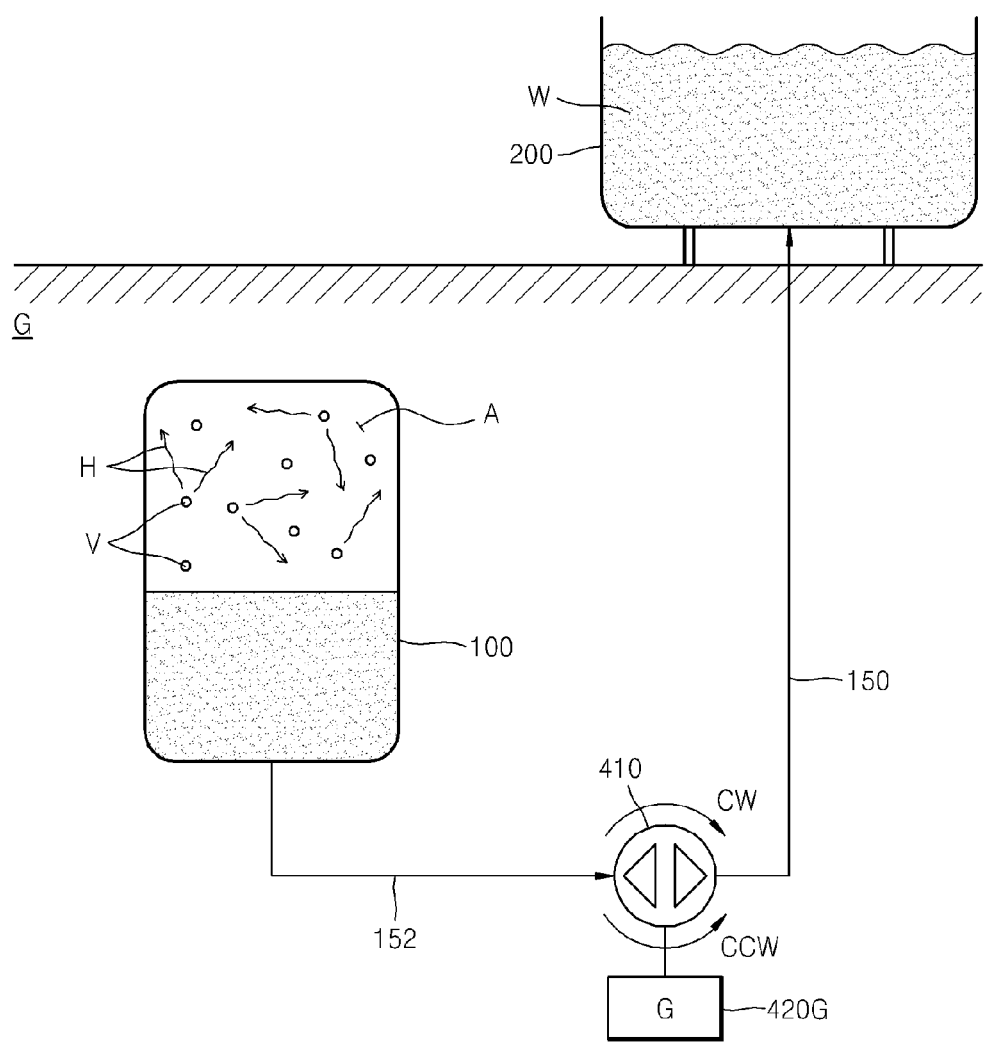
FIG. 5 is a schematic view illustrating a process of generating power using energy stored in the energy storage system according to the exemplary embodiment of FIG. 1.

In the operation of discharging of the water W in the storage tank 100 (S40), the water W in the storage tank 100 is discharged to the reservoir 200 via the second flow path 152. FIG. 5 is a schematic view illustrating an operation of discharging the water W in the storage tank 100. As shown in FIG. 5, in a state where the third flow path 154 is closed, when the first flow path 150 and the second flow path 152 are open, the water W is transferred to the reservoir 200 through the pump/turbine 410 of the first flow path 150 due to the pressure of the compressed air in the storage tank 100. The compressed air in the storage tank 100 expands and absorbs heat from latent heat H formed by coagulation of the water vapor V included in the air and the water stand in the storage tank 100. Accordingly, notwithstanding the expansion, since a temperature of the compressed air is uniformly maintained, that is, the air goes under a thermodynamic process similar to an isothermal expansion process, a loss of the pressure due to a decrease in temperature due to the expansion may be effectively prevented.

In the operation of generating electricity using pressure of the discharged water (S50), the water W is transferred from the storage tank 100 to the reservoir 200 due to the pressure inside the storage tank 100 in such a way that the pump/turbine 410 connected to the first flow path 150 rotates and the generator 420G connected to the pump/turbine 410 generates power. On the first flow path 150, a flow control valve (not shown) and a water-pressure control valve (not shown) may be installed to control a rotational amount of the pump/turbine 410 and a generation amount of the generator 420G. Power generated by the generator 420G may be used to level electric power output from other power generation plants or to provide supplemental power when electric power generated by other power generation plants is not sufficient to meet electric power demand. As described above, in the case of the energy storage system 1, since expansion of the compressed air goes through the thermodynamic process similar to an isothermal expansion process, a phenomenon of rapidly decreasing power generation efficiency due to the expansion of the air and the decrease of the temperature may be effectively prevented.

As described above, since the air in the storage tank 100 is compressed in accordance with an isothermal process, the energy storage system 1 may have very excellent energy storage efficiency and energy generation efficiency compared with compressed air energy storage CAES systems using an insulating process.

An energy storage system 2 according to another exemplary embodiment will now be described with reference to the drawings.

Figure 6:
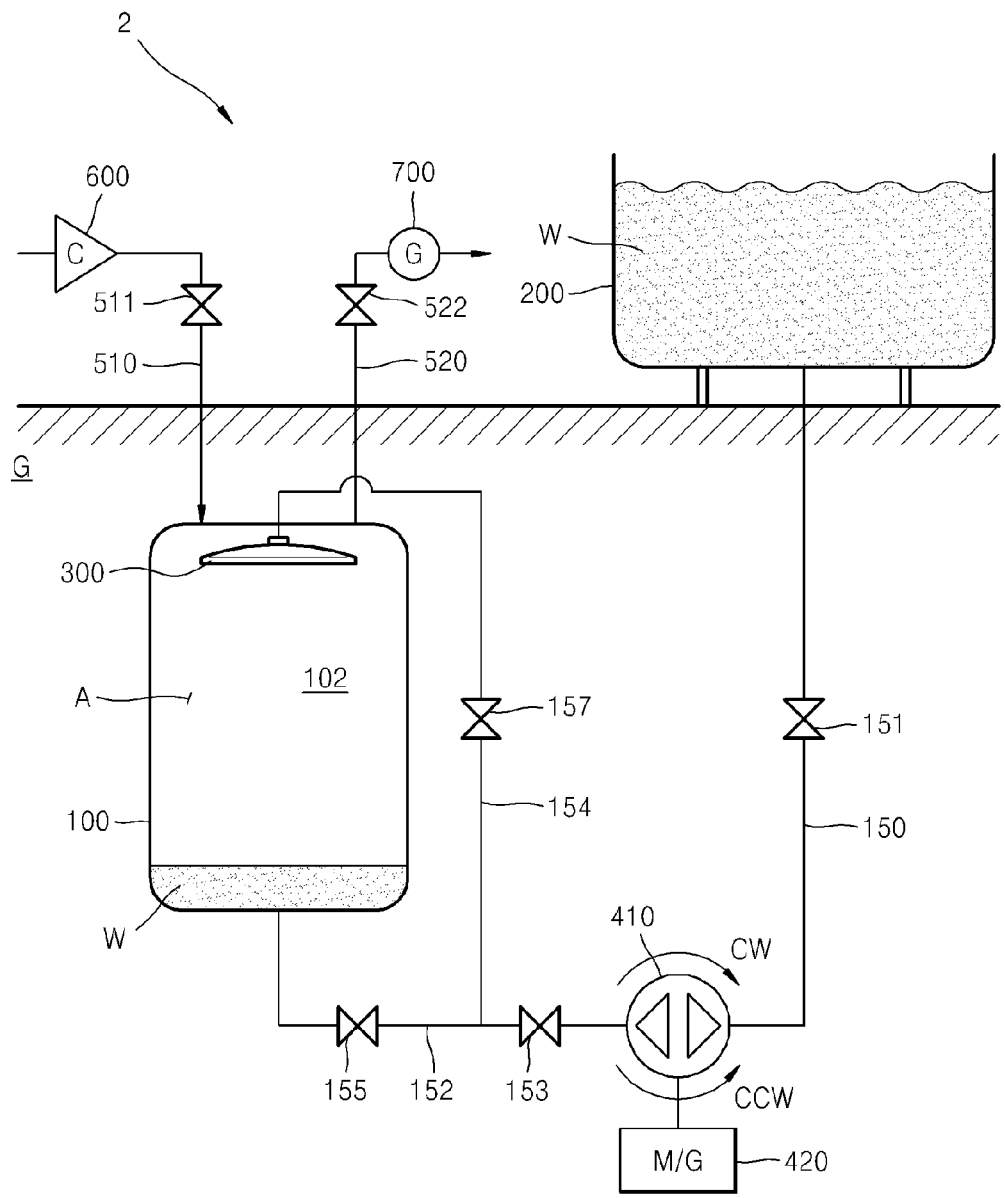
FIG. 6 is a schematic view illustrating an energy storage system according to another exemplary embodiment.

FIG. 6 is a schematic view illustrating the another exemplary embodiment of energy storage system 2.

The energy storage system 2 includes the storage tank 100 having a sealing inner space 102, the reservoir 200, the first flow path 150, the air injection path 510, the air discharge path 520, the spray device 300, the pump/turbine 410, the motor/generator 420, a compressor 600, and a pneumatic turbine generator 700. Since the storage tank 100, the reservoir 200, the first flow path 150, the air injection path 510, the air discharge path 520, the spray device 300, the pump/turbine 410, and the motor/generator 420 are substantially identical to those shown in FIG. 1, a repetitive description thereof will be omitted.

The compressor 600 is installed on the air injection path 510 and injects high-pressure air into the storage tank 100. The compressor 600 has a high compression ratio and a high output relative to the air pump 512 of the energy storage system 1 of FIG. 1, not only to inject the air into the storage tank 100 but also to increase pressure inside the storage tank 100. The compressor 600, to improve the compression ratio and compression efficiency, may be a compressor connected in multiple stages and including an intercooler.

The pneumatic turbine generator 700 is installed on the air discharge path 520, and, when discharging the high-pressure air along the air discharge path 520 from the storage tank 100, rotates a turbine of the pneumatic turbine generator 700 using pressure of the air, and generates electricity using a rotational force of the turbine.

Hereinafter, there will be described a method of storing energy and generating electricity by using the stored energy of the energy storage system 2 according to an exemplary embodiment.

Figure 7:
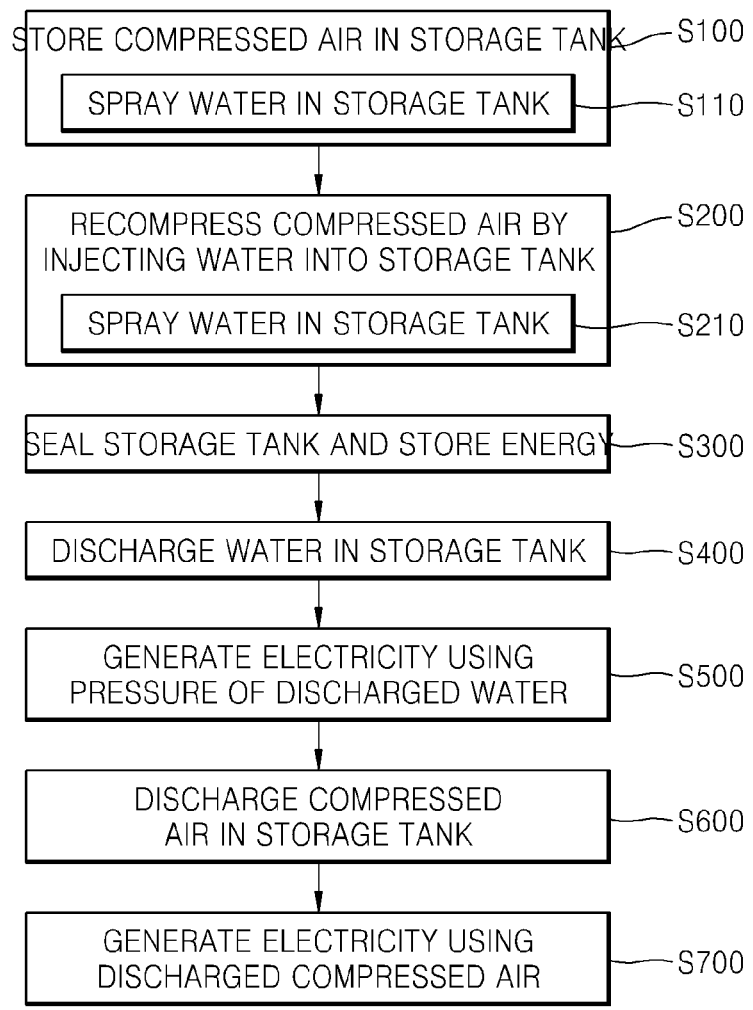
FIG. 7 is a flowchart illustrating a method of operating the energy storage system according to the exemplary embodiment of FIG. 6.

FIG. 7 is a flowchart schematically illustrating the method of operating the energy storage system 2 according to the exemplary embodiment. Referring to FIG. 7, the energy storage system 2 operates through storing compressed air in the storage tank 100 (S100), recompressing the compressed air by injecting water W into the storage tank 100 (S200), sealing the storage tank 100 and storing energy therein (S300), discharging the water W in the storage tank 100 (S400), generating electricity by using pressure of the discharged water (S500), discharging the compressed air in the storage tank 100 (S600), and generating electricity by using the discharged compressed air (S700).

Figure 8:
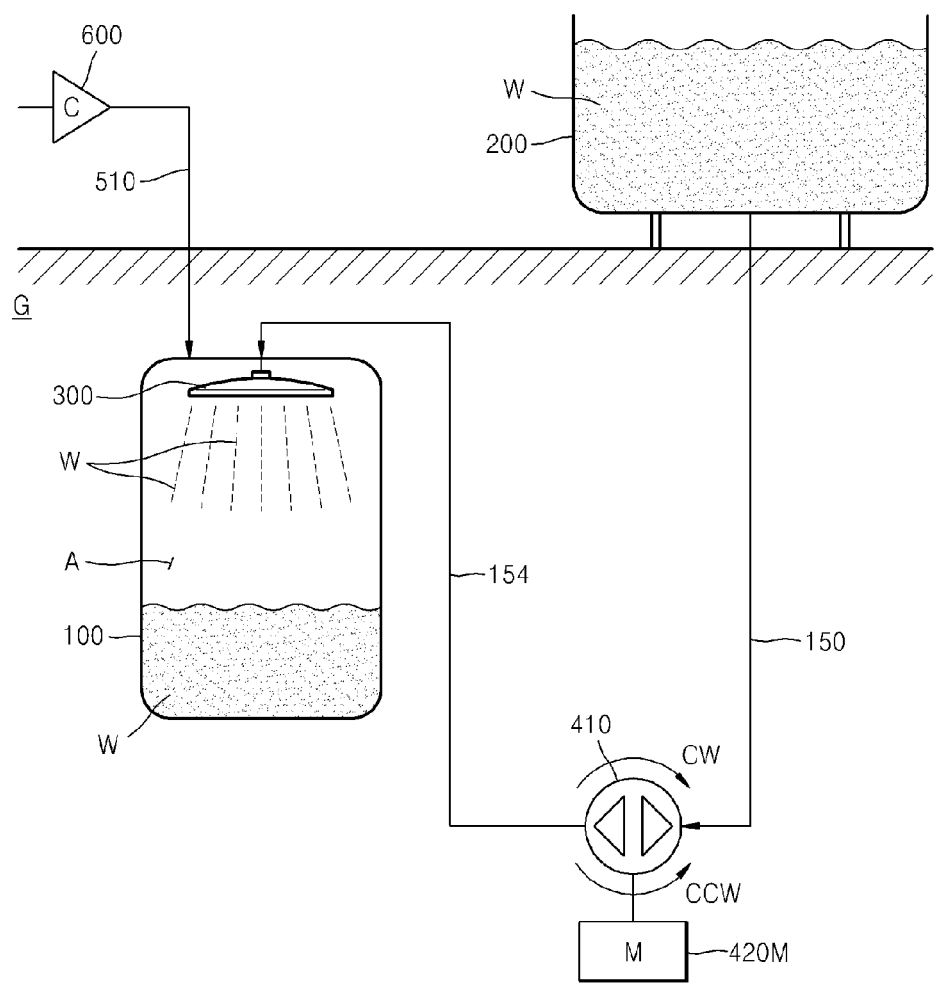
FIGS. 8 and 9 are views illustrating a state of storing energy in the energy storage system according to the exemplary embodiment of FIG. 6.

In the operation of storing of the compressed air in the storage tank 100 in (S100), the valve 511 of the air injection path 510 is opened, and air pressure inside the storage tank 100 is forcibly increased using the compressor 600. The present operation may further include spraying water W into the storage tank 100 (S110). FIG. 8 is a schematic view illustrating a process of simultaneously compressing the air in the storage tank 100 while spraying the water W to maintain a temperature. As shown in FIG. 8, the air in the storage tank 100 is compressed simultaneously while spraying the water W, thereby effectively reducing a temperature increase in air compression process. Thus, efficiency drop in air compression process may also be reduced.

Figure 9:
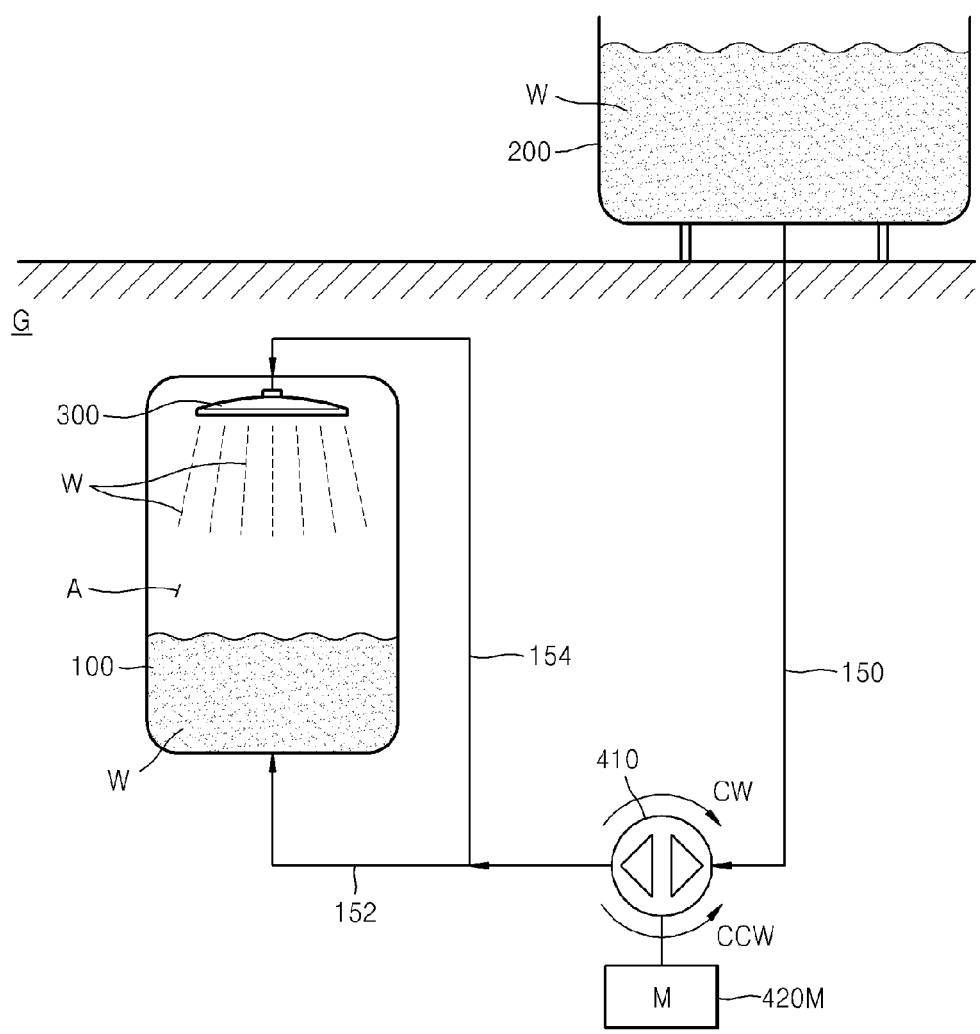

In the operation of recompressing of the compressed air by injecting water W into the storage tank 100 (S200), after the air is compressed to a predetermined level by the compressor 600, the water W is forcibly injected into the storage tank 100 using the pump/turbine 410, thereby additionally compressing the air in the storage tank 100. FIG. 9 is a schematic view illustrating an operation of recompressing the compressed air by injecting the water W into the storage tank 100. Referring to FIG. 9, in the present operation, the air injection path 510 of the storage tank 100 is closed and the water W is injected into the storage tank 100 via the second flow path 152 and/or the third flow path 154. Since the pump/turbine 410 may generate a higher pressure than a maximum pressure attainable by the compressor 600, even with increased pressure inside the storage tank 100, it is still possible to forcibly inject the water W into the storage tank 100 to generate a higher pressure. Since the air is recompressed while injecting the water W into the storage tank 100, the water W may be sprayed using the spray device 300 to further restrain an increase in temperature of the air. In the present operation, the pump/turbine 410 functioning as a pump for compressing the air inside the storage tank 100 may be operated using surplus electric power from an external source.

Figure 10:
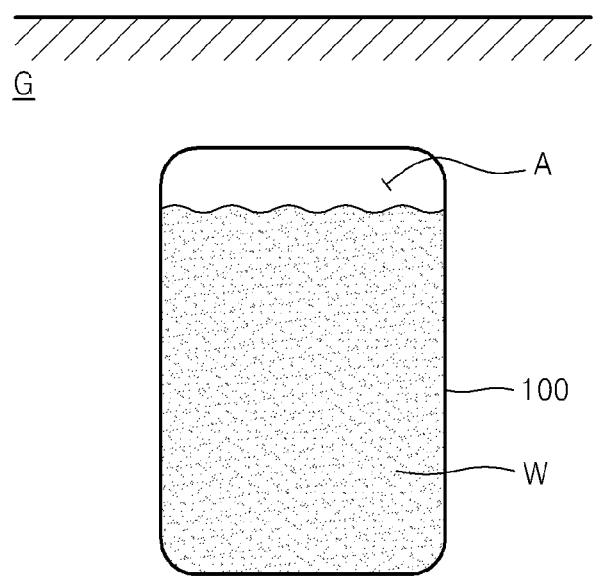
FIG. 10 is a view illustrating a state of storing energy in the energy storage system according to the exemplary embodiment of FIG. 6.

In the operation of sealing of the storage tank 100 and storing energy therein (S300), the second flow path 152, the third flow path 154, the air injection path 510, and the air discharge path 520 connected to the storage tank 100 are all closed, and the storage tank 100 is sealed to maintain the pressure, thereby storing pressure energy as shown in FIG. 10. Since there is a large amount of water W in the storage tank 100, it is possible to uniformly maintain a temperature thereof.

In the discharging of the water W in the storage tank 100 (S400), the water W is transferred from the storage tank 100 to the reservoir 200 by opening the second flow path 152. In the present operation, the water W is transferred via the second flow path 152 and the first flow path 150 and rotates the pump/turbine 410 disposed on the first flow path 150.

Figure 11:
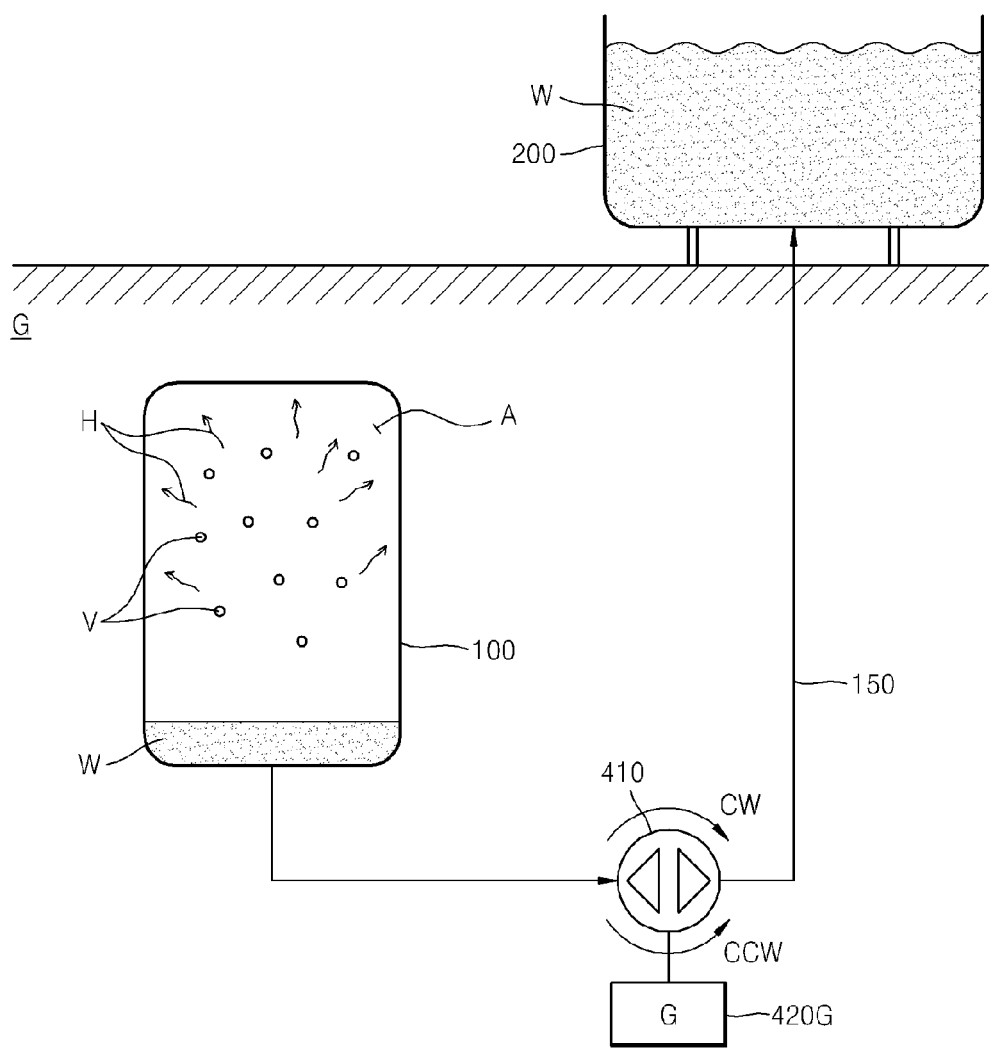
FIGS. 11 and 12 are views illustrating a process of generating power using energy stored in the energy storage system according to the exemplary embodiment of FIG. 6.

In the operation of generating of electricity using pressure of the discharged water (S500), the pump/turbine 410 is rotated by the pressure of the water W flowing through the first flow path 150 in such a way that the generator 420G connected to the pump/turbine 410 converts the rotational force of the pump/turbine 410 into electric energy. That is, the pump/turbine 410 functions as a turbine connected to the generator 420G in this case. FIG. 11 is a schematic view illustrating an operation of generating electricity using the pressure of the discharged water. Referring to FIG. 11, the pump/turbine 410 and the generator 420G connected thereto is operated by the pressure of the water W flowing through the first flow path 150. That is, energy stored in the storage tank 100 in the form of pressure energy inside the storage tank 100 is converted into the form of electric energy. On the first flow path 150, a flow control valve (not shown) and a pressure control value (not shown) may be installed to control a flow and pressure of the water W passing through the pump/turbine 410.

While discharging the water W from the storage tank 100, though the pressure inside of the storage tank 100 is decreased, the temperature inside the storage tank 100 may be maintained to be uniform due to latent heat H of water vapor V inside the storage tank 100 and thermal quantity of the water standing in the storage tank 100. Accordingly, it is possible to effectively prevent a rapid decrease of power generation efficiency.

In the operation of discharging of the compressed air in the storage tank 100 (S600), the high-pressure air inside the storage tank 100 is discharged via the air discharge path 520. The operation of discharging the compressed air in the storage tank 100 may be performed after generating electricity by discharging the water W in the storage tank 100 and may also be performed simultaneously with the operation of generating electricity by discharging the water W in the storage tank 100.

Figure 12:
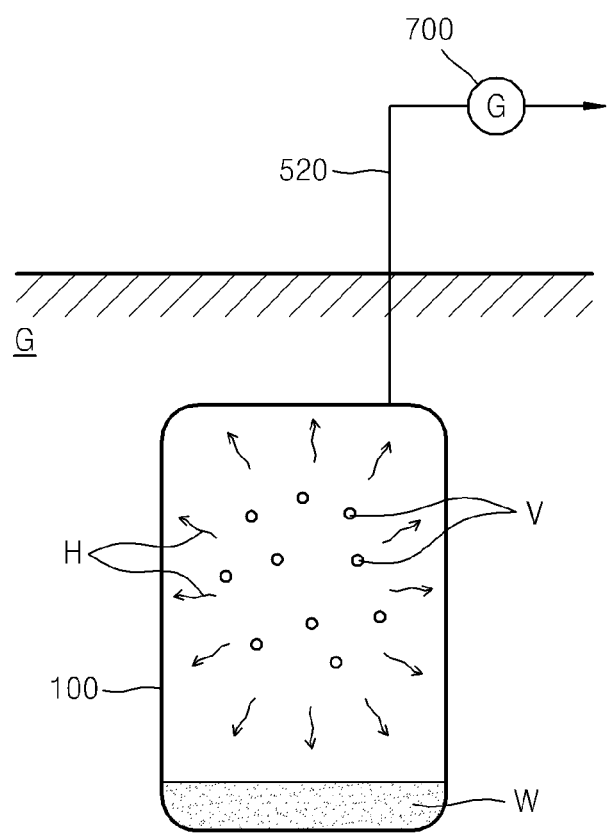

In the operation of generating of electricity using the discharged compressed air (S700), a turbine of the pneumatic turbine generator 700 is rotated using the pressure of the air discharged via the air discharge path 520 and electric power is generated using a rotational force of the turbine. FIG. 12 is a schematic view illustrating such operation. Referring to FIG. 12, when the high-pressure air is discharged to rotate the pneumatic turbine generator 700, the discharged high-pressure air expands and absorbs heat that may be supplied from latent heat H of water vapor V and water W in a liquid state. Accordingly, in the case of the present exemplary embodiment, though the high-pressure air is discharged and expands, it is possible to effectively restrain a rapid decrease of a temperature of the discharged high-pressure air and a rapid decrease of an electric power generation due to the discharge of the high-pressure air.

The operation of generating electricity using the compressed air (S700), as shown in FIG. 12, may be performed by installing a turbine and a generator on the air discharge path 520, and a method of burning a fuel along with the compressed air may be additionally implemented to further increase a power generation amount.

Figure 13:
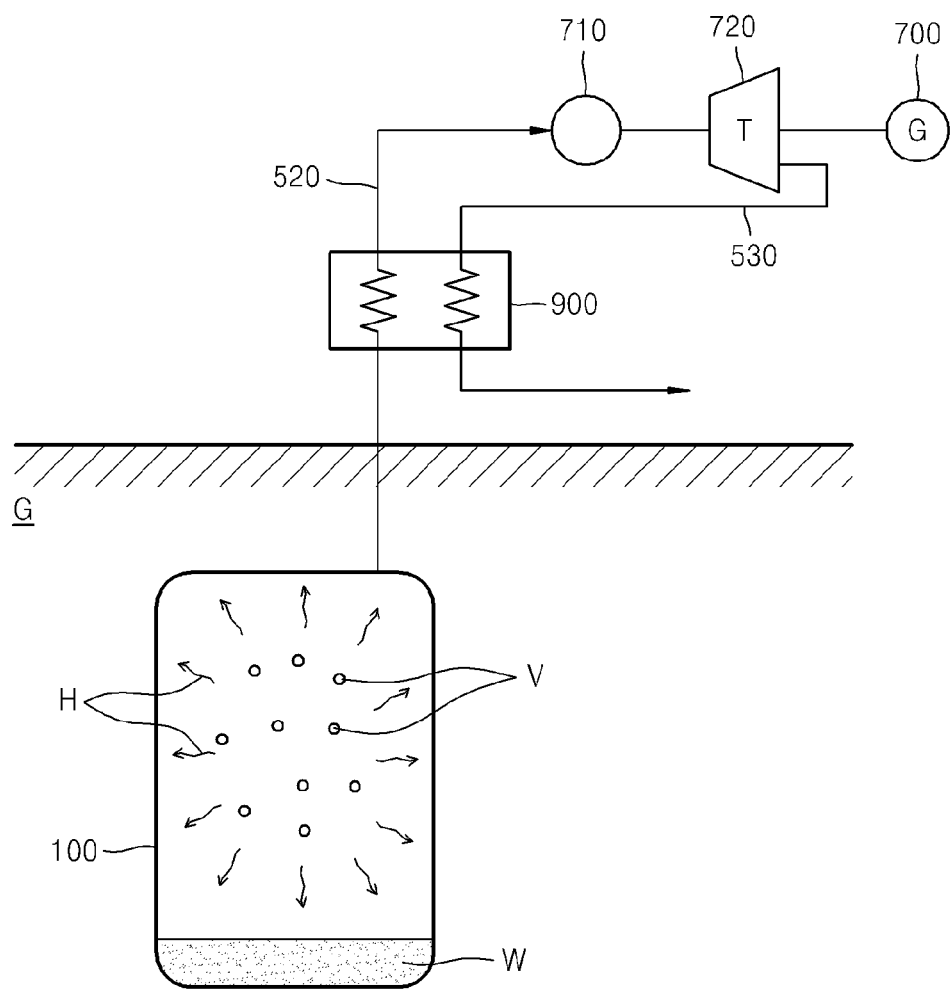
FIG. 13 is a schematic view illustrating a variance in a part of the energy storage system according to the exemplary embodiment of FIG. 6.

FIG. 13 is a schematic view illustrating the method of burning the fuel along with the compressed air. Referring to FIG. 13, the compressed air discharged via the air discharge path 520 flows into a combustor 710 and is mixed with the fuel, thereby forming a high-pressure combustion gas after being combusted in the combustor 710. The combustion gas flows into a turbine 720 and rotates the turbine 720 in such a way that the pneumatic turbine generator 700 can generate power with greater outputs. In this case, the combustion gas passing through the turbine 720 is discharged outwardly via an exhaust path 530 and flows into a regenerative heat exchanger 900 before the exhaust. The regenerative heat exchanger 900 applies heat to the compressed air before the compressed air is injected into the combustor 710, by using heat of the discharged combustion gas. When heating the compressed air before the compressed air is injected into the combustor 710, a temperature, a volume, and pressure of the compressed air are increased.

When operating a generator by burning a fuel and using the compressed air as described above, it is possible to obtain a combustion gas with a higher-temperature and higher-pressure than in a case of generating electric power by simply using pressure of the compressed air, thereby increasing a power output of the generator. Also, it is possible to provide uniform power generation amounts of the generator by controlling an amount of the fuel.

As described above, since using a combination of compressing air by using the compressor 600 and recompressing air by pumping water W, the energy storage system 2 provides improved compression efficiency and generation efficiency relative to CAES systems of the related art.

In the present exemplary embodiment, though it is described that air is recompressed by the pump/turbine 410 after compressing the air using the compressor 600 in series, compressing the air using the compressor 600 and the recompressing the air using the pump/turbine 410 may also be performed simultaneously. When compression performance of the compressor 600 exceeds the pressure head attainable by the pump/turbine 410, the compression of the air using the pump/turbine 410 may be performed first, followed by the compression of the air using the compressor 600. In the compressing of the air, to prevent an increase of a temperature due to the compressed air, the storage tank 100 may be filled with water W to a certain level or water W may be sprayed inside the storage tank 100.

Figure 14:
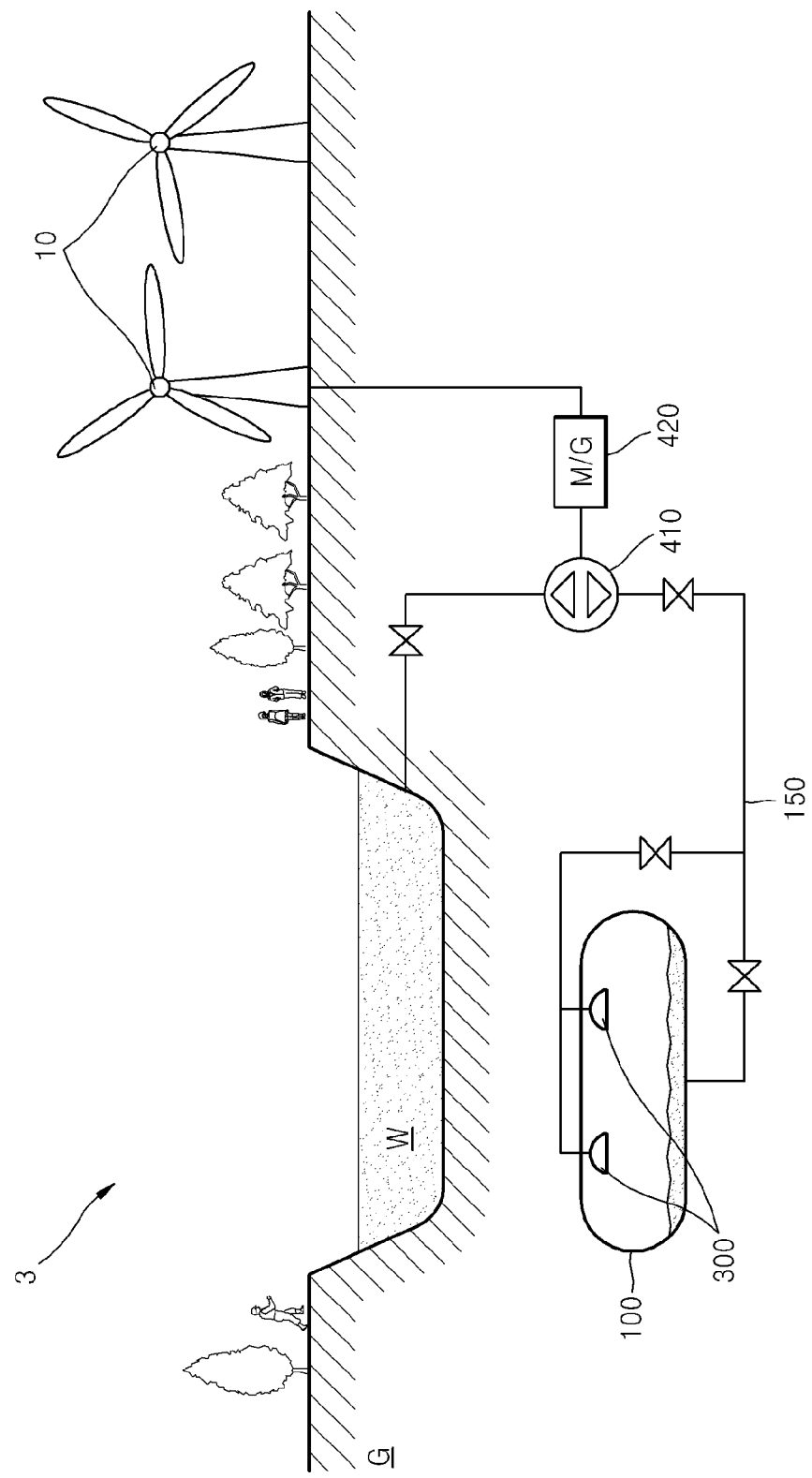
FIG. 14 is a schematic view illustrating an energy storage system according to still another exemplary embodiment.

Hereinafter, there will be described an energy storage system 3 according to another exemplary embodiment with reference to FIG. 14. FIG. 14 is a schematic view illustrating the energy storage system 3. Referring to FIG. 14, the energy storage system 3 includes the storage tank 100, a reservoir, the first flow path 150, an air injection path, an air discharge path, the spray devices 300, the pump/turbine 410, and the motor/generator 420. Since the functions of the storage tank 100, the first flow path 150, the spray devices 300, the pump/turbine 410, and the motor/generator 420 are substantially identical to those of the described previous embodiments, a repetitive description thereof will be omitted.

As shown in FIG. 14, in the present exemplary embodiment, the reservoir may be a manmade lake or a natural lake. Also, the storage tank 100 may be installed by being buried under the ground G below the reservoir. As described above, when the reservoir is a lake and the storage tank 100 is buried below the lake, there is no need to provide an additional space for installing the storage tank 100. Also, recreational areas may be built surrounding the lake for public use.

As described above, according to the present exemplary embodiment, the energy storage system 3 may effectively smoothen outputs of newly constructed renewable energy generation facilities 10 such as wind-power generation facilities and may also improve upon living environments of residents nearby.

Hereinafter, there will be described an energy storage system 4 according to yet another embodiment with reference to FIG. 15.

Figure 15:
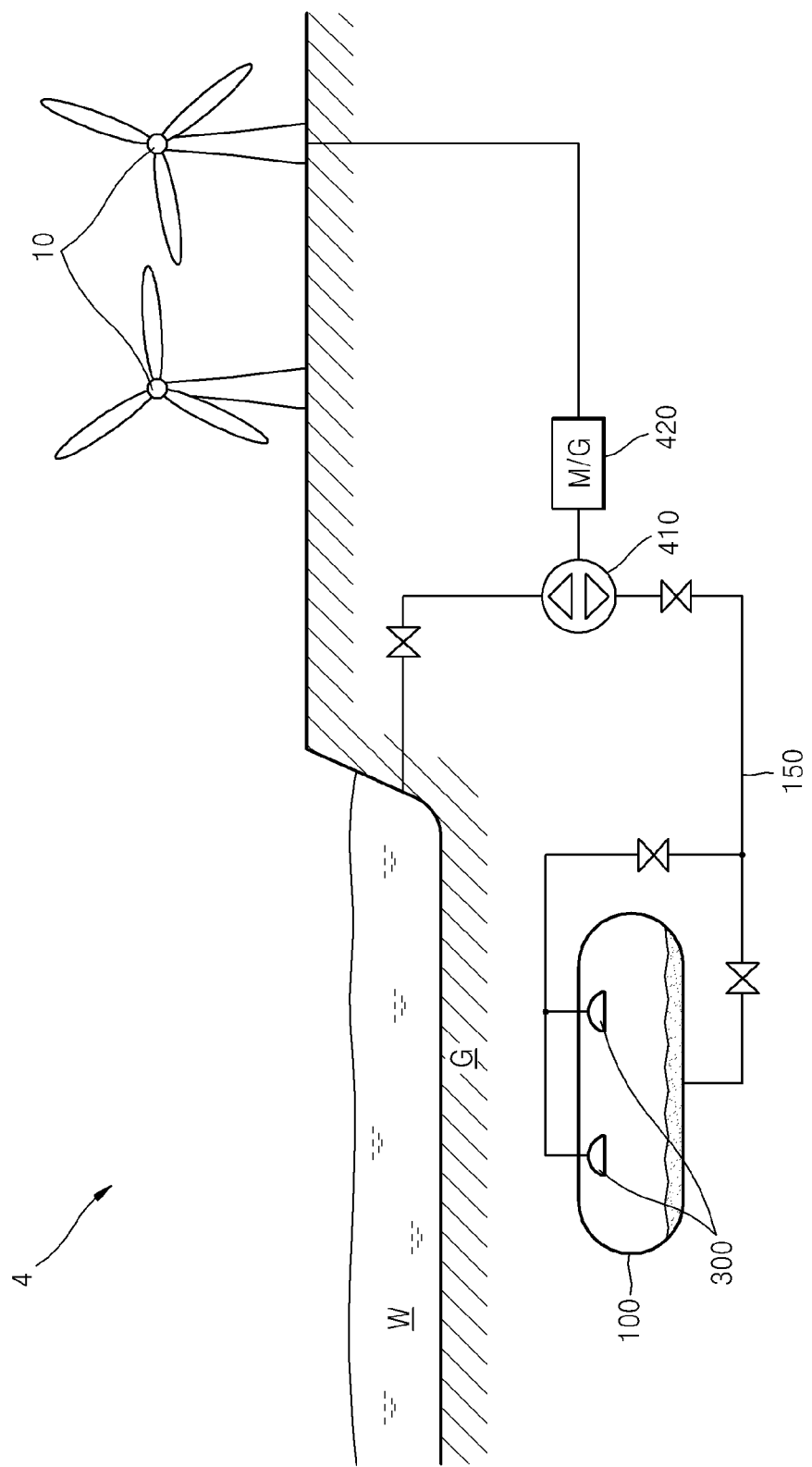
FIG. 15 is a schematic view illustrating an energy storage system according to yet another exemplary embodiment.

FIG. 15 is a schematic view illustrating the energy storage system 4. Referring to FIG. 15, the energy storage system 4 includes the storage tank 100, a reservoir, the first flow path 150, an air injection path, an air discharge path, the spray devices 300, the pump/turbine 410, and the motor/generator 420. Since the functions of the storage tank 100, the first flow path 150, the spray devices 300, the pump/turbine 410, and the motor/generator 420 are substantially identical to those of the described embodiment, a repetitive description thereof will be omitted.

The energy storage system 4 uses the sea as the reservoir. When using the sea as described above, there is no concern for lack of water. Also, since there is little variance of a temperature underground according to season, the storage tank 100 is buried below the bottom of the sea, therefore the storage tank 100 may be consistently maintained at a uniform temperature. When a temperature of the storage tank 100 is maintained as being uniform, since a compression ratio may also be uniformly maintained, energy storage capacity may be kept consistent regardless of the season.

Since it is possible to install a tidal-power generation plant and a wave-power generation plant on the coast, and because it is advantageous to install a wind-power generation plant due to large amounts of wind present on the coast, the energy storage system 4 is installed on the coast together with such new renewable energy generation facilities 10. New renewable energy generation facilities 10 can thus take advantage of combined tidal-power generation and wind-power generation.

For example, though it is described that the energy storage systems 1, 2, and 3 include the spray devices 300, the energy storage systems 1, 2, and 3 may not include a spray device. In case the energy storage system does not include a spray device, to broaden a surface of water in the storage tank 100, the storage tank 100 may be formed in a horizontally wide shape.

Also, though it is described that power is generated using the generator of the motor/generator 420 installed on the first flow path 150, the energy storage system may generate power by using only the pneumatic turbine generator 700 installed on the air discharge path 520, without using the generator of the motor/generator 420 on the first flow path 150. Additionally, the energy storage system may generate power by using both the generator of the motor/generator 420 on the first flow path 150 and the pneumatic turbine generator 700 on the air discharge path 520 at the same time as discussed with reference to FIG. 12.

According to the exemplary embodiments discussed above, the energy storage system may be installed on a small scale relative to pumped storage power generation plants, may provide thermal energy loss that is relatively less in comparison to existing compressed air storage systems, and may effectively restrain a decrease of power generation efficiency due to a drop of air temperature while generating power.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A method of storing and recovering energy, the method comprising:
   providing fluid in a reservoir;
   injecting the fluid into a storage tank;
   compressing air in the storage tank;
   maintaining pressure inside the storage tank;
   discharging the injected fluid in the storage tank using the compressed air to the reservoir; and
   generating electricity using the discharged fluid,
   wherein the method further comprises injecting compressor air generated by a compressor into the storage tank,
   wherein the compressing of the air comprises compressing the air in the storage tank until the compressed air in the storage tank reaches a previously determined pressure, and
   wherein the injecting of the fluid into the storage tank is performed after the injecting of the compressor air into the storage tank.

2. The method of claim 1 further comprising spraying the stored fluid into the storage tank.

3. The method of claim 2, wherein the spraying of the stored fluid into the storage tank further comprises simultaneously injecting of the fluid into the storage tank.

4. The method of claim 1 further comprising discharging the compressed air in the storage tank and generating electricity using the discharged compressed air.

5. The method of claim 1 further comprising:
   discharging the compressed air in the storage tank, combusting a fuel with the discharged compressed air and generating a combustion gas; and
   generating electricity using the generated combustion gas.

6. The method of claim 5, further comprising heating the discharged compressed air using the combustion gas after the generating of the electricity.

* * * * *